United States Patent
Luan et al.

(10) Patent No.: US 12,306,960 B1
(45) Date of Patent: May 20, 2025

(54) CYBER DETECTION ANALYTICS ENGINE

(71) Applicant: Morgan Stanley Services Group Inc., New York, NY (US)

(72) Inventors: Jinfeng Luan, Shanghai (CN); John Gao, Shanghai (CN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/969,536

(22) Filed: Dec. 5, 2024

(51) Int. Cl.
G06F 21/57 (2013.01)

(52) U.S. Cl.
CPC .................................. G06F 21/577 (2013.01)

(58) Field of Classification Search
None
See application file for complete search history.

(56) References Cited

U.S. PATENT DOCUMENTS

| | | |
|---|---|---|
| 9,798,540 B1 | 10/2017 | Helie |
| 11,055,405 B1 | 7/2021 | Jin et al. |
| 11,743,281 B1 | 8/2023 | Behl et al. |
| 11,956,253 B1* | 4/2024 | Lin .......................... G06N 7/01 |
| 2015/0067533 A1* | 3/2015 | Volach ................. G06Q 10/107 715/752 |
| 2016/0344762 A1* | 11/2016 | Jou ....................... G06F 21/577 |
| 2017/0099309 A1 | 4/2017 | Di Pietro et al. |
| 2020/0311262 A1 | 10/2020 | Nguyen et al. |
| 2020/0314117 A1 | 10/2020 | Nguyen et al. |
| 2021/0203673 A1 | 7/2021 | dos Santos et al. |
| 2022/0292417 A1 | 9/2022 | Hen et al. |
| 2023/0007023 A1 | 1/2023 | Andrabi et al. |
| 2023/0110056 A1 | 4/2023 | Gullikson et al. |
| 2023/0325498 A1* | 10/2023 | Whalen ................. G06F 21/566 726/23 |
| 2023/0418948 A1* | 12/2023 | Karpovsky ........... G06F 21/554 |

* cited by examiner

*Primary Examiner* — Fatoumata Traore
(74) *Attorney, Agent, or Firm* — Leason Ellis LLP

(57) ABSTRACT

Cybersecurity alerts are detected and processed. At least one computing device is configured to access origin data representing a plurality of cybersecurity alerts, and host computer and time of alert respectively associated with each of the plurality cybersecurity alerts are identified. The plurality of cybersecurity alerts are grouped via host computer information, and sorted by time of alert respectively associated with each of the plurality of cybersecurity alerts. Alerts can be divided into sets, and determinations made for determining a true finding or false positive and generate a respective risk factor associated with the current alert group associated with the respective cybersecurity alert.

18 Claims, 7 Drawing Sheets

The present disclosure relates, generally, to cybersecurity and, more particularly, to processing and handling cybersecurity alerts.

CYBER DETECTION ANALYTICS ENGINE

FIELD

The present disclosure relates, generally, to cybersecurity and, more particularly, to processing and handling cybersecurity alerts.

BACKGROUND

Cyberthreat detection and advanced handling, particularly in enterprise-wide information technology ("IT") environments, is problematic on many fronts. A daily plethora of alerts representing cyberattacks or threats of cyberattacks, including malware, virus dissemination and execution, data hacking, data scanning, data theft, and other illegal activity stemming from various devices. Managing the alerts, including to analyze the alerts, detect false positives, determine common thematic alerts, determine abnormal alerts, and to identify just those few alerts out of the thousands received each day that require immediate attention is problematic.

It is with respect to these and other considerations that the disclosure made herein is presented.

BRIEF SUMMARY

In one or more implementations of the subject matter disclosed herein, a method and system are provided for processing and handling cybersecurity alerts. At least one computing device is configured to access origin data representing a plurality of cybersecurity alerts. The origin data is processed by the computing device(s) to identify host computer and time of alert respectively associated with each of the plurality cybersecurity alerts. The at least one computing device groups the plurality of cybersecurity alerts as a function of respective host computer information, and sorts the grouped cybersecurity alerts by the time of alert respectively associated with each of the plurality of cybersecurity alerts. Further, the at least one computing device divides cybersecurity alerts into current alert group sets, as a function of the time of alert respectively associated with each of the plurality of cybersecurity alerts. For each respective cybersecurity alert associated with the current alert group sets, where the respective cybersecurity alert is determined to be an abnormal alert: the device(s) determine whether the respective cybersecurity alert is a true finding or false positive and generate a respective risk factor associated with the current alert group associated with the respective cybersecurity alert. The at least one computing device processes the origin data associated with each of the cybersecurity alerts in the respective group sets into vector data representing current alert patterns. For each vector data associated with the respective cybersecurity alerts representing current alert patterns, the at least one computing device determines whether the respective cybersecurity alert is a true finding or false positive, and generates a respective risk factor associated with the current alert pattern associated with the respective cybersecurity alert. For each respective top K ranking alert of the current alert patterns and the top K ranking alert associated with the current alert group sets: the computing device(s) transmit each respective cybersecurity alert to at least one other computing device for downstream processes.

In one or more implementations of the present disclosure, the at least one computing device executes a Hierarchical Density-Based Spatial Clustering of Applications with Noise ("HDBSCAN") algorithm to locate clusters.

In one or more implementations of the present disclosure, the at least one computing device executes the HDBSCAN algorithm to locate clusters representing outlier nodes.

In one or more implementations of the present disclosure, the at least one computing device provides information associated with each top K ranking alert of the current alert patterns and each top K ranking alert associated with the current alert group sets to at least one model, thereby updating the at least one model for improving accuracy.

In one or more implementations of the present disclosure, the at least one computing device scores and ranks at least one of each respective group and each respective pattern to determine the true finding or the false positive.

In one or more implementations of the present disclosure, the origin data comprise information from logs and represent at least one of: a web site being or having been accessed; at least one file created, modified, or accessed; and a respective process or type of process.

In one or more implementations of the present disclosure, at least one of the cybersecurity alerts represent at least one of malware activity, hacking activity, and virus activity.

In one or more implementations of the present disclosure, the downstream processes are associated with a case management system.

In one or more implementations of the present disclosure, the alert groups are further established as a function of a period of silence between cybersecurity alerts.

In one or more implementations of the present disclosure, the at least one computing device determines a cosine similarity to determine the false positive or true finding.

In one or more implementations of the present disclosure, the at least one computing device applies at least one historical false pattern and historical true finding to determine each top K ranking alert of the current alert patterns and each top K ranking alert associated with the current alert group sets.

In one or more implementations of the present disclosure, the risk factor is determined by: $Risk(group_j)=[1-Score_{FP}(group_j)]+Score_{TF}(group_j)$.

Other features of the present disclosure are shown and described herein.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION OF THE EMBODIMENTS

Figure 1:
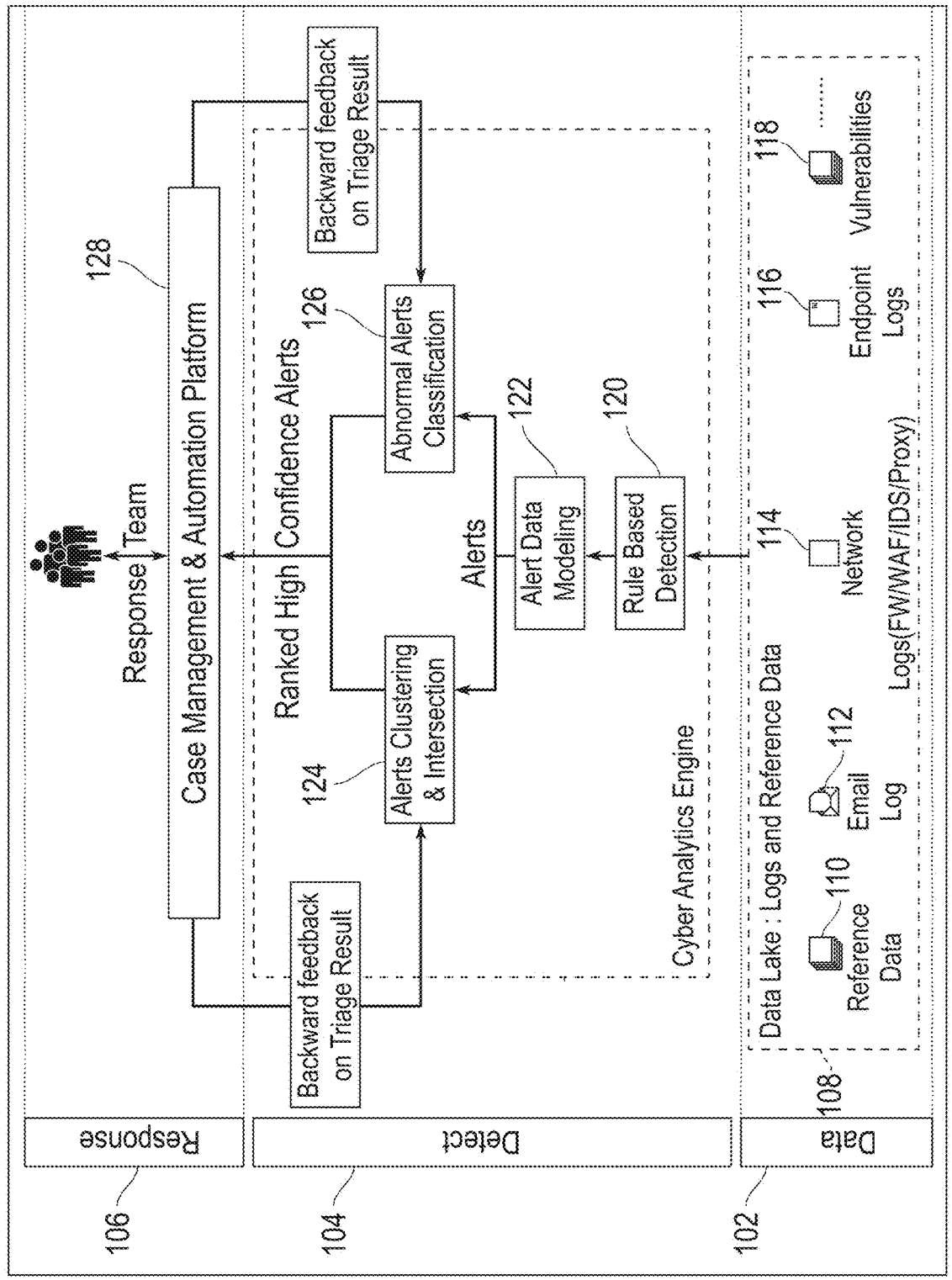
FIG. 1 shows an overview, including with regard to data, detection, and response, of an example implementation of the present disclosure.

By way of summary and introduction, the present disclosure includes inventive subject matter that can be applied, for example, for innovative data modeling and analytics to cyberthreat alert information and improves detection and handling of alerts associated with cyberthreats ("cybersecurity" alerts). Cybersecurity alerts can be treated as respective risk indicators, and groups of alerts can be defined or otherwise managed as a function of an alert silence period. Based on various statistics, an overall distribution can have characteristics of a long tail. Alerts silence intervals that are longer than a threshold, for example 10 minutes, rarely relate to the same alerts and, accordingly, can be treated as different alert groups. Cybersecurity alerts that appear close or generally adjacent in time, particularly on the same host computing device, can be grouped. In one or more implementations, rules can be defined associated with cybersecurity alerts, and the more frequently a rule is triggered, the greater the probability that the rule requires adjustment ("tuning"), and the less important alerts that occur in response to the rule are considered to be.

In one or more implementations of the present disclosure, various kinds of enterprise logs, such as endpoint logs, network logs, scan logs (e.g., and alerts-related reference data, can be stored and correlated for defining and using cyber alert rule sets. Network logs can include, for example, firewall logs ("FW"), web application firewall logs ("WAF"), intrusion detection system logs ("IDS") and web proxy logs ("Proxy"). In one or more implementations, reference data can include hardware and software inventory, record information of a host (e.g., a server computing device), software that is or is not running on the host, and host configuration information (e.g., operating system, system software installation, hardware configuration, or the like). Other reference data can include user information (e.g., user security authorization, department the user is affiliated with, user contact information, or the like) can be accessed and analyzed by one or more computing devices. Anomalous combinations of data, such as a user in the finance department running a lot of commands that are normally run by user in IT department, can be made and used to uncover threats of illegal cyberactivity with improved certainty.

In one or more implementations of the present disclosure, computing devices can be configured by executing programming instructions to specially operate in various contexts. Referred herein, generally, as "engines," one or more of such configured devices can access data information, perform operations on the data, generate information, output information, or perform other computing processes. In one or more implementations of the present disclosure, a data processing engine can generate alert groups via data modeling, which can be standardized (e.g., normalized) and vectorized. Alert clustering and intersection engine clustering can be performed on one or more alert groups, thereby leading to discoveries of common alert patterns, which can be ranked and used for predicting and handling cyberthreats. Outliers that comprise abnormal alerts, such as due to a respective server being accessed, can be classified and ranked highly to represent a high likelihood of a cyberattack. Thereafter, a high tier selection of the ranked alerts, for example, the top K ranking, can be made and used in advancement of respective cyberthreat handling. Moreover, discovery of respective cyberthreats can be effective to expose potential or actual vulnerabilities to illegal cyberactivity in the enterprise. Operations can be implemented to preclude repeat threats and fend off attacks before they occur.

Accordingly, a storage and processing data repository can be provided for structured, semi-structured, and unstructured data (e.g., a "data lake"). A data processing engine provides data management and cyberthreat analysis, including by correlating scan logs with one or more pre-defined cyber alert rule sets. In one or more implementations, investigation results can be backward propagated and used to update to a knowledge base associated with a cyber analytics engine, thereby increasing classification and clustering accuracy from increased usage of the system.

In operation, systems and methods disclosed herein process thousands of daily generated cybersecurity alerts, for example, in respective enterprise-wide IT departments. Computing devices can be configured to detect cyberthreats using industrial standard detection applications (e.g., Sigma Rule) and machine learning and artificial intelligence operations can differentiate false positive alerts from the generated alerts. In addition, patterns can be detected in combinations of data, which can represent common activity that is less likely to pose a serious threat. A form of alert triage can be established as a function of the detected patterns can executed automatically by one or more engines, Cybersecurity alert information can be processed to discover outliers, representing a higher likelihood of imminent or serious harm.

Referring now to the drawings, FIG. 1 shows an overview of the present disclosure, including with regard to data 102, detection 104, and response 106. Also shown is data lake 108, having different data and log types, including reference data 110, email logs 112, network logs 114, endpoint logs 116, and vulnerabilities data 118. Rule based detection engine 120 can be configured to correlate scan logs, including as a function of one or more pre-defined cyber alert rule sets. Alert data modeling group engine 122 can be configured to standardize and vectorize data associated with a respective alert group, and alert clustering and intersection engine 124 can cluster and group alerts, thereby revealing common alert patterns and rankings. Abnormal alert classification engine 126 classifies alerts with respective risk rankings and the ranked, classified alert exported to case management and automation platform 128, including for determining top K ranking alerts, per respective response team investigation. In one or more implementations of the present disclosure, investigation results can be backward-propagated and used to update to a knowledge base associated with a cyber analytics engine, thereby increasing classification and clustering accuracy from increased usage of the system.

One or more data processing engines 120, 122, 124, and 126 can be configured by executing programming instructions, for example, stored on non-transitory processor readable media, to identify usual or customary cybersecurity alert patterns, as well as corresponding abnormal alerts, including by executing Hierarchical Density-Based Spatial Clustering of Applications with Noise ("HDBSCAN") algorithms to locate clusters as thematic patterns. One of ordinary skill will recognize HDBSCAN as a kind of hierarchical clustering algorithm, based on density. HDBSCAN can locate clusters with different sparsity and determine which nodes are so sparse that they can be considered as outliers.

Figure 2:
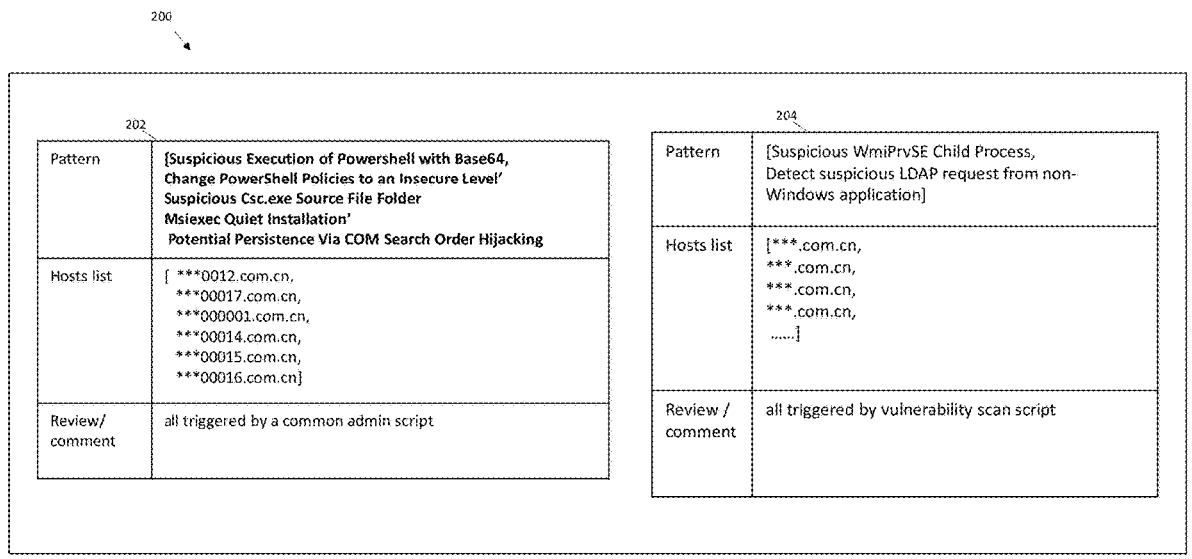
FIG. 2 illustrates two example respective cybersecurity alert pattern records that include patterns of the cybersecurity alerts, hosts list, and comments, in accordance with an example implementation of the present disclosure.

FIG. 2 illustrates two example respective cybersecurity alert pattern records 202, 204 that include patterns of the cybersecurity alerts, hosts list, and comments. For example, pattern record 202 regards a plurality of cybersecurity alerts representing similar suspicious POWERSHELL activity, substantially similar host information, and were all triggered by a common admin script. Pattern record 204 regards a plurality of cybersecurity alerts having suspicious processes and LDAP requests from a non-MICROSOFT WINDOWS application, have substantially similar host information, and were all triggered by vulnerability scan script.

Similarities between a true finding pattern set and a false positive pattern set can be calculated, and similarities of historic waiting patterns and label records obtained. Weighted data can be processed by one or more HDBSCAN algorithms and clusters returned, of which each represents a pattern. There may be some differences within a cluster, and one or more computing processes treat common parts of Sigma rules as a pattern.

One or more implementations of the present disclosure can include data modeling engine 122 (whether operating in isolation or in combination with one or more of data processing engines 120, 124, 126), which can be configured to convert an original alert data into corresponding alert groups and vectors. Each pattern and group can, thereafter, be scored and ranked. One or more modules can operate to update one or more models with new or corrected data, thereby improving accuracy. Model updating can occur as a function of security case management algorithms, which are applied to generate a common attack pattern and an abnormal alerts group, for which a corresponding case can be created in case management and automation platform 128. Threats and corresponding alerts can, thereafter, be accurately determined to be true findings or false positive findings. One or more data processing engines can apply information associated with the outcomes, including to update one or more models as a function of syncing back to algorithms.

Accordingly, one or more computing devices can be configured to execute instructions stored on processor readable media, e.g., non-transitory processor readable media, to collect, process, generate, and transmit data, including from network security, enterprise security, and maintenance logs. An agent (e.g., a software implemented robot or "bot") can be configured to collect alert data automatically, such as from windows security logs, email metadata including header information, network traffic logs, endpoint logs, or other logs containing information of interest in connection with cybersecurity threats. Logs can include, for example, information representing a web site being or having been accessed by a computing device associated with a respective user. Such information can represent files that have been created, modified, accessed, or the like, as well as respective processes, types of processes, or other activity information associated with the computing devices.

The present disclosure, including systems and methods for processing information representing cyberthreat alerts, provides a technical solution to improve cyberthreat detection and handling. For example, alerts are placed into groups, which can include placement and relationships of alerts with relation to a single object. Objects can be used in data modeling procedures and groups generated and analyzed for determining a severity or likelihood of a cyberthreat preceding a cyberattack.

Further, data processing operations can be performed by one or more data analytics engines, in accordance with one or more example implementations of the present disclosure. Such processing addresses challenges associated with identifying common attack patterns and identifying abnormal alerts or alerts that may represent unusual or uncommon attacks. In some cases, common thematic alerts can indicate a malware/hacking activity occurring on hosts and user devices, such as virus infection, hacking tool scanning, or the like. Moreover, such common alerts can be related or unrelated by co-incidental for a certain duration. One or more computing devices can be configured by executing code stored on processor readable media (e.g., non-transitory processor readable media) for performing data processing operations to score common thematic alerts. In one or more implementations, only alerts that are assigned a score above a minimum threshold, for example, are selected for further review. Scoring can be based at least partly on previously reviewed false positives, which can be factored in the analysis to lower a score associated with an alert, thereby improving scoring operations in the future. Each challenge can be evaluated as a function of innovative data modeling and alert scoring, including via model update modules and leveraged HDBSCAN algorithms.

The alert scoring module can operate to score and rank each pattern and group. The model update module can be used to update and improve the model's accuracy. Model updates can be based on a security case management system, in which algorithms generate a common attack pattern or an abnormal alerts group, and a corresponding case can be created, for example, in a case management system. Further evaluation can be performed to determine a true positive (referred to herein, generally, as a "true finding") or a false positive, which can be used by one or more data processing engines for updating one or more respective models.

Figure 3A:
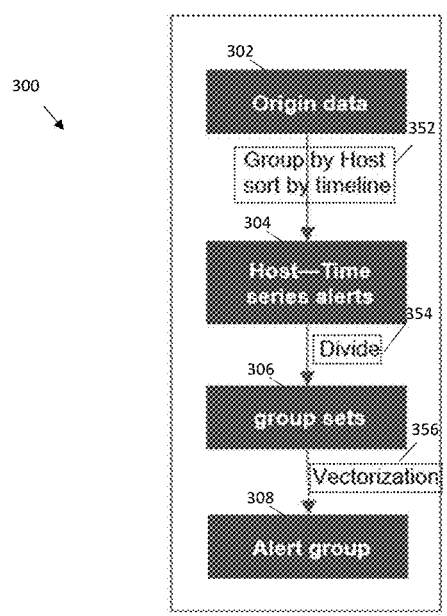
FIG. 3A is a simple block diagram illustrating high-level steps associated with an example implementation of the present disclosure.

In accordance with the present disclosure, one or more computing devices can process alert data initially to identify common attack patterns and to identify abnormal alerts. With regard to identifying common attack patterns, alert groups can be created for cyberthreat alerts occurring during adjacent times on the same host. Such determination can be made based on origin current alert data 302 (FIG. 3A). One or more time periods can be defined, such as 10 minutes. One or more computing devices can divide two alerts into the same group where a silence interval of the two alerts differs by less than 10 minutes. Alternatively, if the silence interval is greater than 10 minutes, the two alerts can be divided into two different groups. This approach preserves continuity and correlation between alerts, and each group can represent a continuous set of operations, such as nefarious activity caused by a hacker.

Figure 3B:
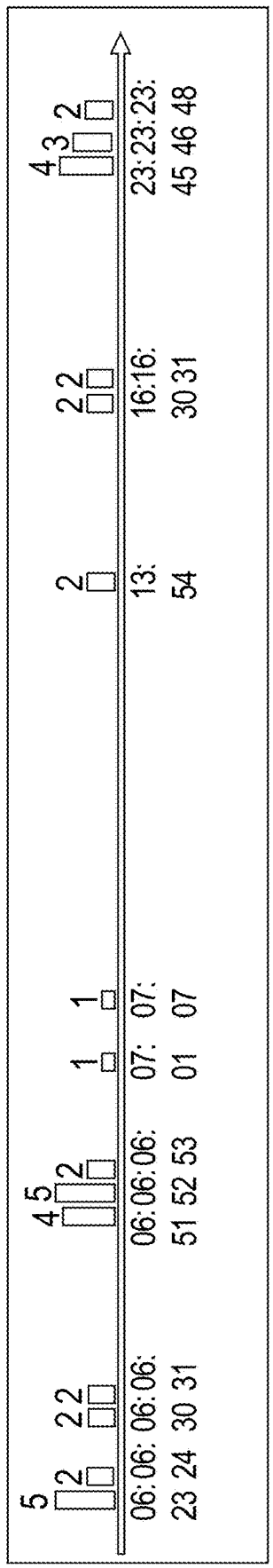
FIG. 3B illustrates an example representing a single time lime view for a number of alerts; illustrates a single host example, in which alert.

FIG. 3B illustrates a single host example, in which alerts occur (e.g., singlehostexample.com.cn). The example shown in FIG. 3B represents a single timeline view for a number of alerts.

Figure 3C:
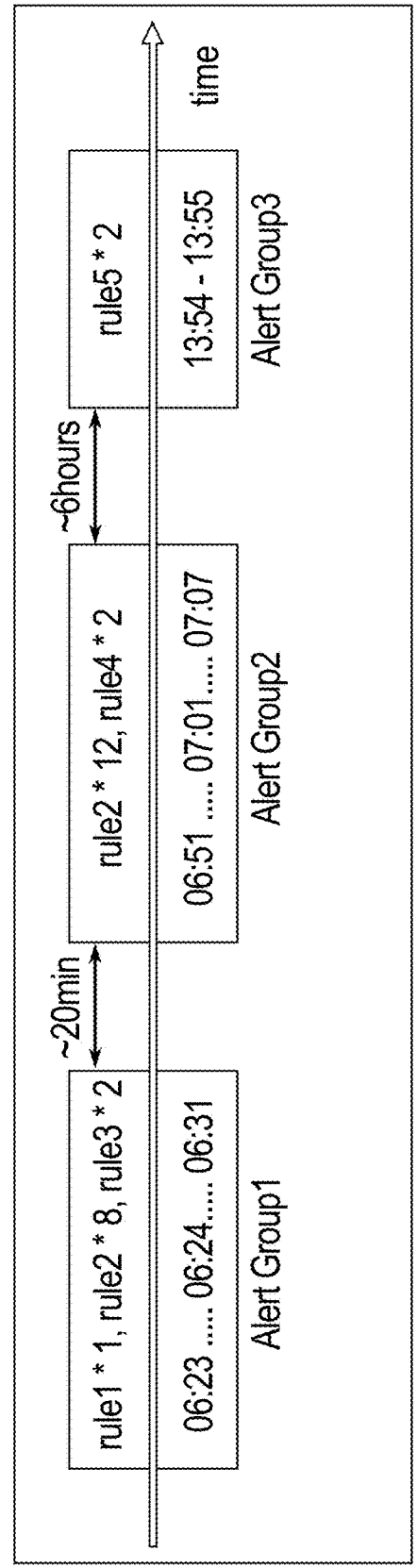
FIG. 3C illustrates three alert groups created as a function time periods occurring between respective alerts.

FIG. 3C illustrates three alert groups created as a function time periods occurring between respective alerts that are associated with respective cyberthreat rules. In the example shown in FIG. 3C, one occurrence at 06:23 of a cyberthreat associated with rule1, eight occurrences at 06:24 of a cyberthreat associated with rule 2 and two occurrences at 06:31 of rule 3 are grouped together in Alert Group1. Continuing with the example represented in FIG. 3C, a period of silence occurs for approximately twenty minutes, after which cyberthreat activity resumes and Alert Group2 is created. Thereafter, after a six hour period of silence, after which cyberthreat activity resumes and Alert Group3 is created.

Each alert group can be represented using a vector of fixed dimensions, wherein each dimension represents one Sigma rule. The value can equal the number of times the Sigma rule was triggered in list, for example, as shown below in Table 1.

TABLE 1

|             | Rule1 | Rule2 | Rule3 | Rule4 | Rule5 |
|-------------|-------|-------|-------|-------|-------|
| Alert Group1 | 1    | 8     | 2     | 0     | 0     |
| Alert Group2 | 0    | 12    | 0     | 2     | 0     |
| Alert Group3 | 0    | 0     | 0     | 0     | 2     |

Moreover, one or more computing devices can be configured to optimize the vectors, for example, by adjusting the weight of the Sigma rules as shown in Table 2. In such case, the reciprocal of the Sigma rule triggered total times in the last year is taken as its weight, $$W(\text{rule}_i) = \frac{1}{\text{Times}(\text{rule}_i)} \quad \text{Normalize}(\text{list}_i^j) = \frac{\text{list}_i^j}{\sum_{j=1}^{n} \text{list}_i^j}$$

TABLE 2

|             | Rule1 | Rule2 | Rule3 | Rule4 | Rule5 |
|-------------|-------|-------|-------|-------|-------|
| Alert Group1 | 1/1  | 8/20  | 2/2   | 0     | 0     |
| Alert Group2 | 0    | 12/20 | 0     | 2/2   | 0     |
| Alert Group3 | 0    | 0     | 0     | 0     | 2/2   |

Moreover, one or more computing devices normalize the vector, for example, by making their length to 1, as shown below in Table 3.

TABLE 3

|             | Rule1 | Rule2 | Rule3 | Rule4 | Rule5 |
|-------------|-------|-------|-------|-------|-------|
| Alert Group1 | 0.68 | 0.24  | 0.68  | 0.00  | 0.00  |
| Alert Group2 | 0.00 | 0.52  | 0.00  | 0.87  | 0.00  |
| Alert Group3 | 0.00 | 0.00  | 0.00  | 0.00  | 1.00  |

FIG. 3A is a simple block diagram illustrating high-level steps 300 associated with an example implementation of the present disclosure. Origin data 302 is accessed by one or more computing devices and grouped 352 as a function of at least one of host device and sorted by time as shown and described herein and associated with the cybersecurity alert. Thereafter, host-time series alerts 304 are processed and divided 354 into group sets 306, including as shown and described herein. Thereafter, one or more computing devices configured by executing programming instructions perform vectorization 356 on the records and alert group 308 generated.

It is to be appreciated that using vectors to represent alert groups provides for improved extensibility. Moreover, an optimized vector in accordance with the present disclosure not only reflects small differences between alert groups, but also reduces the impact of noise alerts, thereby improving the accuracy of the method.

Continuing in connection with an example implementation of the present disclosure, a HDBSCAN algorithm can be used to cluster all current alert groups. Each cluster in the clustering results represents a pattern. Since the groups contained in each cluster may be slightly different, Sigma rules that are triggered by all the groups in the cluster, i.e., the intersection of alert groups, are used as its pattern. Each pattern is represented using vectors in the same way as in the second step, described above.

Thereafter, one or more computing devices can rank risk scores of the patterns. In one or more implementations the cosine similarity of the current found pattern is calculated to represent a possible threat, historical false positive patterns and true finding patterns. The average of top K in false positive patterns is taken as the Score_FP and sum of top K in true finding patterns as Score_TF. The two can be combined to calculate a risk score, as follows:

$$\text{Risk}(\text{pattern}_j) = [1 - \text{Score}_{FP}(\text{pattern}_j)] + \text{Score}_{TF}(\text{pattern}_j)$$

By scoring and ranking, most of the false positive patterns can be filtered out, thereby reducing the number of alerts that require further analysis. Thereafter, the top N results can be analyzed and divided into false positives and true findings. False positive results can be stored to false positive patterns and true finding results stored to true finding patterns. Thereafter, the weights of Sigma rules and vectors of false positive patterns and true finding patterns can be updated. By storing the results of further alert analysis and modifying weights and vectors, models associated with the present disclosure can be periodically (or continuously) updated to improve accuracy.

Alternatively, and with regard to identifying abnormal alerts, historical alert data can be modeled similarly as described above in connection with the first two steps associated with identifying common attack patterns. Furthermore, one or more computing devices can execute instructions stored on processor-readable media (e.g., non-transitory processor readable media) to remove outliers in historical alert groups that are found, for example, by a HDBSCAN algorithm. This ensures that remaining groups are highly like to be false positive results. In this way, the present disclosure significantly improves handling of a massive amount of unsupervised data and builds initial groups of alerts representing false positives.

As noted above with regard to identifying common attack patterns, steps associated identifying abnormal alerts can include modeling historical alert data by modeling current alert data same and obtaining the corresponding alert groups and vectors. Thereafter, risk scores associated with the current alert groups can be ranked. For example, and as described above, the cosine similarity of the current alert group can be calculated to identify false positive groups and true finding groups. Thereafter, the average of top K in false positive groups can be taken as the Score_FP and sum of top K in true finding groups as Score_TF. The two are combined to generate the Risk Score, as follows:

$$\text{Risk}(\text{group}_j) = [1 - \text{Score}_{FP}(\text{group}_j)] + \text{Score}_{TF}(\text{group}_j)$$

Thereafter, the top-n results can be analyzed, including to divide them into false positive and true finding. False positive results can be stored to false positive groups and true finding results can be stored to true finding groups. Thereafter, the weights of Sigma rules and vectors of false positive groups and true finding groups can be updated.

Figure 4:
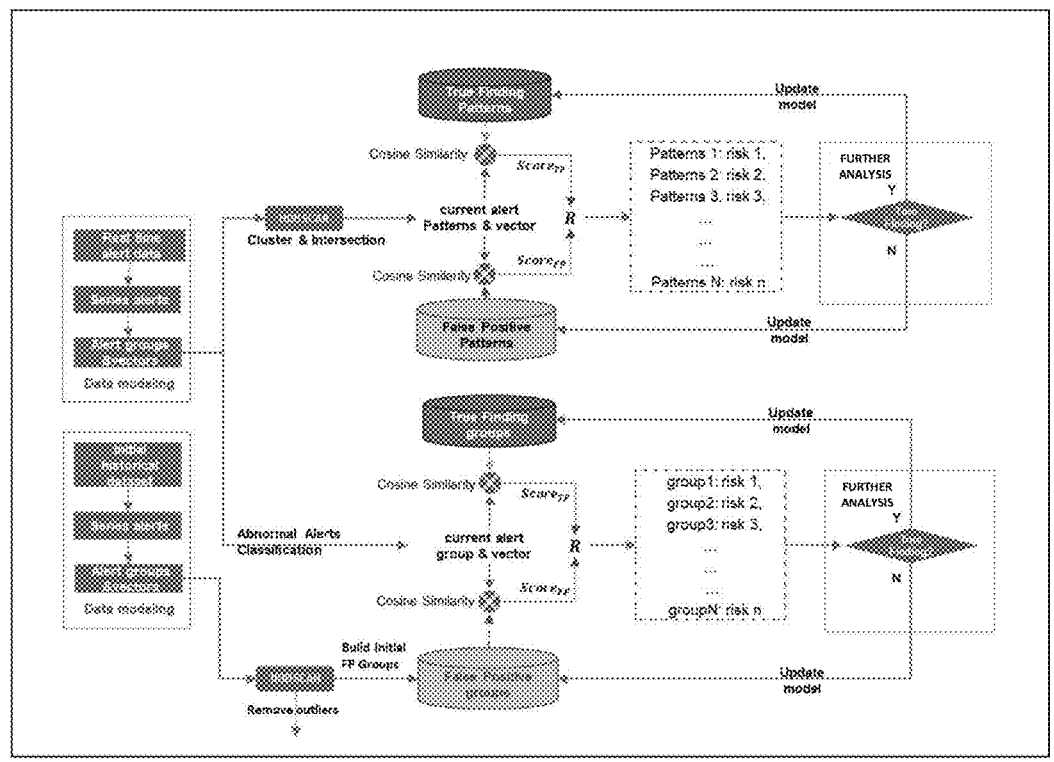
FIG. 4 illustrates a data analytics engine comprising one or more computing devices operating to locate and identify common attack patterns, and to locate and identify abnormal alerts, in accordance with an example implementation of the present disclosure.

Referring now to FIG. 4, a data analytics engine 400, which can comprise one or more computing devices, is shown operating to locate and identify common attack patterns, and to locate and identify abnormal alerts. As illustrated in FIG. 4, data modeling, alert scoring and model update modules can leverage HDBSCAN algorithms, including by converting original alert data into corresponding alert groups and vectors, such as described above. One or more modules can operate to process alerts by scoring and ranking patterns and groups, as well as by updating models and improving accuracy. Model updating can be implemented based on case management and automation platform 128, in which one or more computing devices can be configured by executing respective algorithms to generate information representing common attack patterns or an abnormal alerts group and one or more corresponding records created in case management and automation platform 128. Feedback from further analysis provides for marking the case as True Finding ("TF") or False Positive ("FP), which can be provided to update one or more models and improve information the process, more generally.

One of ordinary skill in the art will appreciate the improved data modeling, processing, and alert handling, including for a plethora of cybersecurity alerts, provided in accordance with teachings herein. Systems and methods disclosed herein go beyond using a fixed time window of alerts as a basic unit for analysis and filtering. Instead, continuity relationships between alerts are factored by one or more computing devices in models and the results processed thereby in a cybersecurity application. One or more computing devices can create alert groups for alerts having occurred in relatively adjacent times and on a common host. A silence interval between alerts is observed and measured. Where two or more alerts' occurrence times differ by less than T minutes, for example, those alerts can be associated with a respective alert group. If a silence interval between alerts is greater than T minutes, two or more alerts can be divided into two or more different groups. T is determined using statistical methods producing reasonable outcomes and can be refined over time. The relationships in conjunction with different alerts are considered, thereby facilitating subsequent triage and analysis in improved ways.

In one or more implementations, vectors are used to represent alert groups uniformly, which can be appropriately optimized. Vectors used to uniformly represent alert groups can make the framework of the present disclosure more concise and extendable. The optimized vector of the present disclosure can capture subtle differences between similar groups and can also reduce the noise impact of Sigma rules, thereby increasing the likelihood of an accurate result.

Furthermore, the present disclosure provides comprehensive coverage by focusing beyond rare, abnormal alerts, and factors common attack patterns. Common attack patterns can indicate malware/hacking activity occurring on several hosts, which may be more serious than attacks associated with abnormal alerts. One or more computing devices associated with the present disclosure identify both common attack patterns and abnormal alerts, and improves identifying those alerts representing actual and serious cybercrime activity. A computing platform, including in the enterprise, is provided with improved security as a function of the computing devices and operations shown and described herein.

Still further, computing devices associated with the present disclosure can be periodically (e.g., continuously) updated and improved according to analysis-results, which further improves accuracy. Further, common thematic alerts which can indicate a malware/hacking activity happening on many hosts, users, and devices (e.g., virus activity, hacking, scanning, or other activity associated with malware). Alerts can be related or be in-conjunction by a certain duration. Such common thematic alerts can be scored and processed to reduce the number of alerts to a manageable number for review. Using the technology disclosed herein, alerts of cyberactivity can be determined to be false positives, and later used for model tuning and/or improving one or more algorithms, thereby lowering the future likelihood false positives. Moreover, false positives can be treated as risk indicators. Further, similarities between true finding pattern set and false positive pattern set can be calculated to determine the similarities of waiting patterns and label records in history.

Accordingly, systems and methods disclosed herein identify common thematic alerts, which can indicate malware, hacking, virus activity, scanning, or other cyberthreat activity occurring on host devices, user devices, or other devices. Some key features include innovative data modeling, which can be used to identify cyber alerts, including those that do not include standardized/uniformed data but are random and with different frequencies. In one or more implementations, the present disclosure uses silence interval to divide alerts into sub-groups, which are then weighted by times of occurrence of alerts. Thereafter, a vector can be built and normalized, such as by cost length, as known in the art. This process provides a consistent representative on alert groups, and improves use of fixed time windows to divide alerts or use alert statistics data per a given period. Further, the present disclosure uses a unified vector representation, which is highly versatile and relatively easy to extend. Still further, the present disclosure provides for continuous updates and improvements, including as a function of previously analyzed results, thereby improving accuracy over time.

The present disclosure provides a technical solution to a problem in which thousands of alerts are generated that trigger sigma rules every day, the vast majority of which are false positives. The present disclosure performs automatic alerts triage, filters false positives, and retains true abnormal alerts for future analysis. Triaged results can be used to evaluate the effectiveness of sigma rules and improve tuning of specific sigma rules. Still further, alerts can be related to each other in various ways, including similar subject matter, at or within a given time, in duration, or by other characteristic. The present disclosure includes features for scoring common thematic alerts, providing a manageable number of alerts for further review, and any further reviewed false positives alerts can be used in future analysis to lower the count of false positives.

Figure 5:
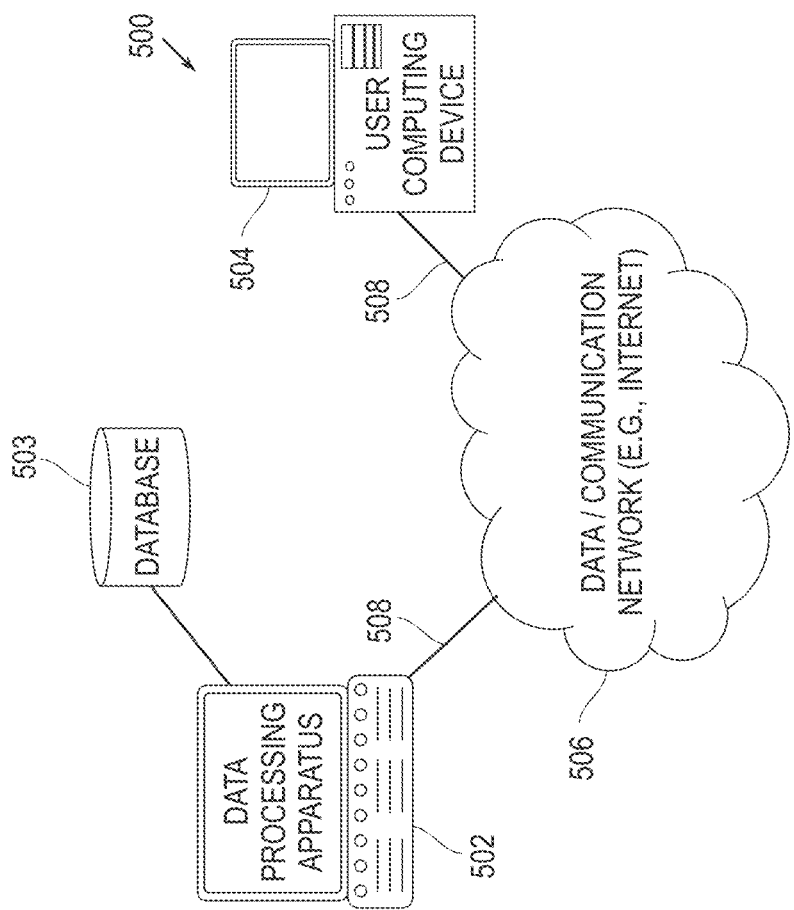
FIG. 5 is a diagram showing an example hardware arrangement that is configured for providing the systems and methods disclosed herein.

Referring to FIG. 5, a diagram is provided that shows an example hardware arrangement that is configured for providing the systems and methods disclosed herein and designated generally as system 500. System 500 can include one or more information processors 502 that are at least communicatively coupled to one or more user computing devices 504 across communication network 506. Information processors 502 and user computing devices 504 can include, for example, mobile computing devices such as tablet computing devices, smartphones, personal digital assistants or the like, as well as laptop computers and/or desktop computers, server computers and mainframe computers. Further, one computing device may be configured as an information processor 502 and a user computing device 504, depending upon operations being executed at a particular time.

With continued reference to FIG. 5, information processor 502 can be configured to access one or more databases 503 for the present disclosure, including source code repositories and other information. However, it is contemplated that information processor 502 can access any required databases via communication network 506 or any other communication network to which information processor 502 has access. Information processor 502 can communicate with devices comprising databases using any known communication method, including a direct serial, parallel, universal serial bus ("USB") interface, or via a local or wide area network.

User computing devices 504 can communicate with information processors 502 using data connections 508, which are respectively coupled to communication network 506. Communication network 506 can be any data communication network. Data connections 508 can be any known arrangement for accessing communication network 506, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 504 preferably have the ability to send and receive data across communication network 506, and are equipped with web browsers, software disclosures, or other means, to provide received data on display devices incorporated therewith. By way of example, user computing device 504 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 506, and that wireless communication can be provided between wireless devices and information processors 502.

System 500 preferably includes software that provides functionality described in greater detail herein, and preferably resides on one or more information processors 502 and/or user computing devices 504. One of the functions performed by information processor 502 is that of operating as a web server and/or a web site host. Information processors 502 typically communicate with communication network 506 across a permanent i.e., un-switched data connection 508. Permanent connectivity ensures that access to information processors 502 is always available.

Figure 6:
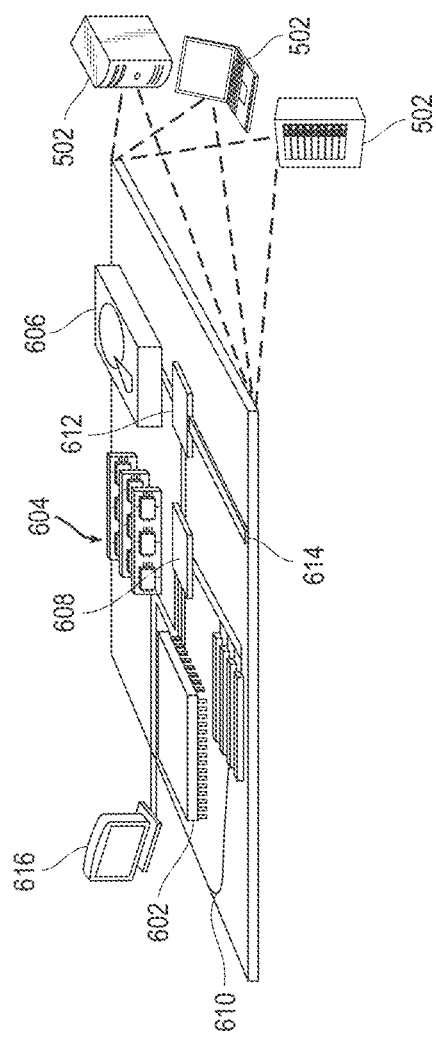
FIG. 6 shows an example information processor and/or user computing device that can be used to implement the techniques described herein.

FIG. 6 shows an example information processor 502 and/or user computing device 504 that can be used to implement the techniques described herein. The information processor 502 and/or user computing device 504 is intended to represent various forms of digital computers, such as laptops, desktops, workstations, personal digital assistants, servers, blade servers, mainframes, and other appropriate computers. The components shown in FIG. 6, including connections and relationships, and their functions, are meant to be exemplary only, and are not meant to limit implementations of the inventions described and/or claimed in this document.

As shown in FIG. 6, the information processor 502 and/or user computing device 504 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and can be mounted on a common motherboard or in other manners as appropriate. The processor 602 can process instructions for execution within the information processor 502 and/or user computing device 504, including instructions stored in the memory 604 or on the storage device 606 to display graphical information for a GUI on an external input/output device, such as a display 616 coupled to the high-speed interface 608. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 604 stores information within the information processor 502 and/or user computing device 504. In some implementations, the memory 604 is a volatile memory unit or units. In some implementations, the memory 604 is a non-volatile memory unit or units. The memory 604 can also be another form of computer-readable medium, such as a magnetic or optical disk.

The storage device 606 is capable of providing mass storage for the information processor 502 and/or user computing device 504. In some implementations, the storage device 606 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 can be configured to manage bandwidth-intensive operations, while the low-speed interface 612 can be configured to manage lower bandwidth-intensive operations. Of course, one of ordinary skill in the art will recognize that such allocation of functions is exemplary only. In some implementations, the high-speed interface 608 is coupled to the memory 604, the display 616 (e.g., through a graphics processor or accelerator), and to the high-speed expansion ports 610, which can accept various expansion cards (not shown). In an implementation, the low-speed interface 612 is coupled to the storage device 606 and the low-speed expansion port 614. The low-speed expansion port 614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter. Accordingly, the automated methods described herein can be implemented by in various forms, including an electronic circuit configured (e.g., by code, such as programmed, by custom logic, as in configurable logic gates, or the like) to carry out steps of a method. Moreover, steps can be performed on or using programmed logic, such as custom or preprogrammed control logic devices, circuits, or processors. Examples include a programmable logic circuit (PLC), computer, software, or other circuit (e.g., ASIC, FPGA) configured by code or logic to carry out their assigned task. The devices, circuits, or processors can also be, for example, dedicated or shared hardware devices (such as ¬¬ laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause these methods to be carried out.

Any of the methods described herein may, in corresponding embodiments, be reduced to a non-transitory computer readable medium (CRM, such as a disk drive or flash drive) having computer instructions stored therein that, when executed by a processing circuit, cause the processing circuit to carry out an automated process for performing the respective methods.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for processing and handling cybersecurity alerts, the method comprising:
    accessing, by at least one computing device configured by executing programming instructions stored on processor, origin data representing a plurality of cybersecurity alerts;
    processing, by the at least one computing device, the origin data to identify host computer and time of alert respectively associated with each of the plurality cybersecurity alerts;
    grouping, by the at least one computing device, the plurality of cybersecurity alerts as a function of respective host computer information;
    sorting, by the at least one computing device, the grouped cybersecurity alerts by the time of alert respectively associated with each of the plurality of cybersecurity alerts;
    dividing, by the at least one computing device, cybersecurity alerts into current alert group sets as a function of the time of alert respectively associated with each of the plurality of cybersecurity alerts;
    for each respective cybersecurity alert associated with the current alert group sets:
    where the at least one computing device determines the respective cybersecurity alert is an abnormal alert:
        determining whether the respective cybersecurity alert is a true finding or false positive; and
        generating a respective risk factor associated with the current alert group associated with the respective cybersecurity alert;
    processing, by the at least one computing device, the origin data associated with each of the cybersecurity alerts in the respective group sets into vector data representing current alert patterns;
    for each vector data associated with the respective cybersecurity alerts representing current alert patterns:
    determining whether the respective cybersecurity alert is a true finding or false positive; and
    generating a respective risk factor associated with the current alert pattern associated with the respective cybersecurity alert; and
    for each respective top K ranking alert of the current alert patterns and the top K ranking alert associated with the current alert group sets:
    transmitting, by the at least one computing device, each respective cybersecurity alert to at least one other computing device for downstream processes; and
    providing, by the at least one computing device, information associated with each top K ranking alert of the current alert patterns and each top K ranking alert associated with the current alert group sets to at least one model, thereby updating the at least one model for improving accuracy.

2. The method of claim 1, further comprising executing, by the at least one computing device, a Hierarchical Density-Based Spatial Clustering of Applications with Noise ("HDBSCAN") algorithm to locate clusters.

3. The method of claim 2, further comprising executing, by the at least one computing device, the HDBSCAN algorithm to locate clusters representing outlier nodes.

4. The method of claim 1, further comprising scoring and ranking at least one of each respective group and each respective pattern to determine the true finding or the false positive.

5. The method of claim 1, wherein the origin data comprise information from logs and represent at least one of: a web site being or having been accessed; at least one file created, modified, or accessed; and a respective process or type of process.

6. The method of claim 1, wherein at least one of the cybersecurity alerts represent at least one of malware activity, hacking activity, and virus activity.

7. The method of claim 1, wherein the downstream processes are associated with a case management system.

8. The method of claim 1, wherein the alert groups are further established as a function of a period of silence between cybersecurity alerts.

9. The method of claim 1, further comprising determining, by the at least one computing device, a cosine similarity to determine the false positive or true finding.

10. The method of claim 1, further comprising applying, by the at least one computing device, at least one historical false pattern and historical true finding to determine each top K ranking alert of the current alert patterns and each top K ranking alert associated with the current alert group sets.

11. The method of claim 1, wherein the risk factor is determined by:

$$Risk(group_j)=[1-Score_{FP}(group_j)]+Score_{TF}(group_j).$$

12. A computer-implemented system for processing and handling cybersecurity alerts, the system comprising:
at least one processor that, when executing instructions stored on non-transitory processor readable media is configured to:
access origin data representing a plurality of cybersecurity alerts;
process the origin data to identify host computer and time of alert respectively associated with each of the plurality cybersecurity alerts;
group the plurality of cybersecurity alerts as a function of respective host computer information;
sort the grouped cybersecurity alerts by the time of alert respectively associated with each of the plurality of cybersecurity alerts;
divide cybersecurity alerts into current alert group sets as a function of the time of alert respectively associated with each of the plurality of cybersecurity alerts;
for each respective cybersecurity alert associated with the current alert group sets:
where the at least one computing device determines the respective cybersecurity alert is an abnormal alert:
determine whether the respective cybersecurity alert is a true finding or false positive; and
generate a respective risk factor associated with the current alert group associated with the respective cybersecurity alert;
process the origin data associated with each of the cybersecurity alerts in the respective group sets into vector data representing current alert patterns;
for each vector data associated with the respective cybersecurity alerts representing current alert patterns:
determine whether the respective cybersecurity alert is a true finding or false positive; and
generate a respective risk factor associated with the current alert pattern associated with the respective cybersecurity alert; and
for each respective top K ranking alert of the current alert patterns and the top K ranking alert associated with the current alert group sets:
transmit each respective cybersecurity alert to at least one other computing device for downstream processes; and
provide information associated with each top K ranking alert of the current alert patterns and each top K ranking alert associated with the current alert group sets to at least one model, thereby updating the at least one model for improving accuracy.

13. The system of claim 12, wherein the at least one processor is further configured by executing instructions stored on non-transitory processor readable media to:
execute a Hierarchical Density-Based Spatial Clustering of Applications with Noise ("HDBSCAN") algorithm to locate clusters.

14. The system of claim 13, wherein the at least one processor is further configured by executing instructions stored on non-transitory processor readable media to:
execute the HDBSCAN algorithm to locate clusters representing outlier nodes.

15. The system of claim 12, wherein the at least one processor is further configured by executing instructions stored on non-transitory processor readable media to:
score and rank at least one of each respective group and each respective pattern to determine the true finding or the false positive.

16. The system of claim 12, wherein the origin data comprise information from logs and represent at least one of: a web site being or having been accessed; at least one file created, modified, or accessed; and a respective process or type of process.

17. The system of claim 12, wherein at least one of the cybersecurity alerts represent at least one of malware activity, hacking activity, and virus activity.

18. The system of claim 12, wherein the at least one processor is further configured by executing instructions stored on non-transitory processor readable media to:
apply at least one historical false pattern and historical true finding to determine each top K ranking alert of the current alert patterns and each top K ranking alert associated with the current alert group sets.

* * * * *